(12) United States Patent
Nishikawa et al.

(10) Patent No.: US 7,320,117 B2
(45) Date of Patent: Jan. 15, 2008

(54) DESIGN METHOD FOR SEMICONDUCTOR INTEGRATED CIRCUIT DEVICE USING PATH ISOLATION

(75) Inventors: Ryota Nishikawa, Ibaraki (JP); Gen Fukatsu, Takatsuki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 259 days.

(21) Appl. No.: 11/167,610

(22) Filed: Jun. 28, 2005

(65) Prior Publication Data
US 2006/0031800 A1 Feb. 9, 2006

(30) Foreign Application Priority Data
Jul. 22, 2004 (JP) .............................. 2004-213693

(51) Int. Cl.
*G06F 17/50* (2006.01)
(52) U.S. Cl. .................................. 716/6; 716/1; 716/3
(58) Field of Classification Search ............... 716/1, 716/6, 18, 3
See application file for complete search history.

(56) References Cited

U.S. PATENT DOCUMENTS

| | | | |
|---|---|---|---|
| 5,696,711 A * | 12/1997 | Makineni | 708/497 |
| 6,336,205 B1 | 1/2002 | Kurokawa et al. | 716/2 |
| 2002/0112213 A1* | 8/2002 | Abadir et al. | 716/4 |
| 2003/0101419 A1* | 5/2003 | Yamashita et al. | 716/1 |
| 2004/0177328 A1* | 9/2004 | Sarkar et al. | 716/1 |
| 2004/0243964 A1* | 12/2004 | McElvain et al. | 716/12 |
| 2005/0010889 A1* | 1/2005 | Barnes | 716/11 |
| 2005/0097486 A1* | 5/2005 | Tyler et al. | 716/6 |

OTHER PUBLICATIONS

Berkelaar, M. et al, "Gate Sizing in MOS Digital Circuits WIth Linear Programming," IEEE, 1990, pp. 217-221.
Coudert, O. et al, "New Algorithms for Gate Sizing: A Comparative Study," 33rd Design Automation Conference, Las Vegas, NV, DAC 96, 1996, 734-739.
Kung, D., "A Fast Fanout Optimization Algorithm for Near-Continuous Buffer Libraries," DAC 98, pp. 352-355.

* cited by examiner

*Primary Examiner*—Vuthe Siek
*Assistant Examiner*—Magid Y. Dimyan
(74) *Attorney, Agent, or Firm*—Steptoe & Johnson LLP

(57) ABSTRACT

A design method for a semiconductor integrated circuit device wherein for a path having a signal arrival time longer than a desired signal arrival time, and among multiple paths in the semiconductor integrated circuit device, a path isolation is performed so that a number of other components to be connected to the output of a component belonging to the path decreases. The design method can be integrated into an automatic design flow using a legacy electronic design automation tool.

18 Claims, 18 Drawing Sheets

F I G. 4
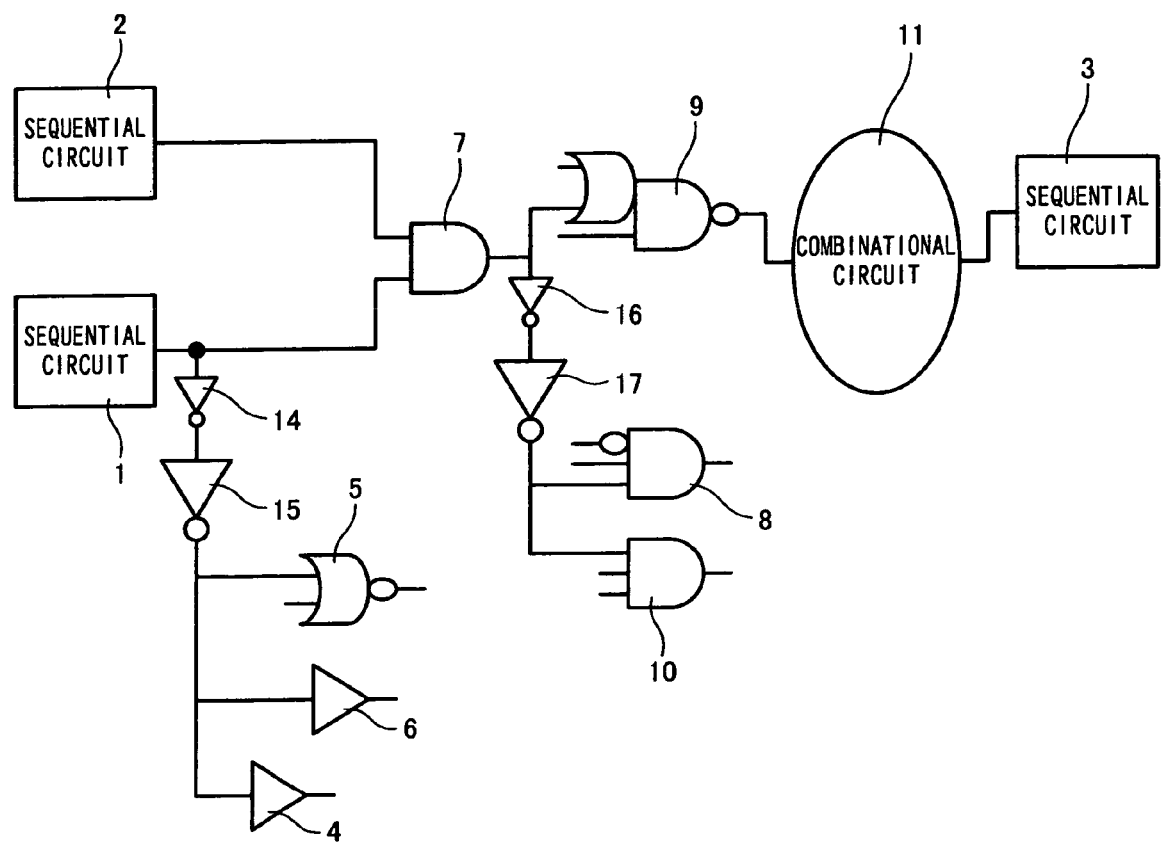

FIG. 12A

```
always@ (posedge CLK or posedge RESET)
    begin
        if (RESET)
            reg1 <= 1b'0
        else
            reg1 <= input
    end
```

$$121 \begin{cases} \text{assign wire1 = reg1 \& reg2;} \\ \text{assign wire2 = reg1 \& reg3;} \\ \text{assign wire3 = reg1 \& reg4;} \\ \text{assign wire4 = reg1 \& reg5;} \end{cases}$$

FIG. 12B

```
always@ (posedge CLK or posedge RESET)
    begin
        if (RESET)
            reg1 <= 1b'0
        else
            reg1 <= input
    end
```

$$122 \begin{cases} \text{INV1 U1(.A(reg1),.Y(wire1\_1));} \\ \text{INV4 U2(.A(wire1\_1),.Y(wire1\_2));} \\ \\ \text{assign wire1 = reg1 \& reg2;} \\ \text{assign wire2 = wire1\_2 \& reg3;} \\ \text{assign wire3 = wire1\_2 \& reg4;} \\ \text{assign wire4 = wire1\_2 \& reg5;} \end{cases}$$

FIG. 12C

```
always@ (posedge CLK or posedge RESET)
  begin
    if (RESET)
        reg1 <= 1b'0
    else
        reg1 <= input
  end
```
⎫ 124

```
module buf1 (Y,A)
    input A;
    output B;
    wire wire1;
    INV1 U2_1(.A(A),.Y(wire1));
    INV4 U2_2 (.A(wire),.Y(Y));
endmodule
```

123 {
```
buf1 U1 (.A (reg1),.Y (wire1_1));

assign wire1 = reg1 & reg2;
assign wire2 = wire1_1 & reg3;
assign wire3 = wire1_1 & reg4;
assign wire4 = wire1_1 & reg5;
```

FIG. 12D

125 {
```
always@ (posedge CLK or posedge RESET)
  begin
    if (RESET)
        reg1 <= 1b'0
    else
        reg1 <= input
  end
```

126 {
```
assign wire1 = reg1 & reg2;
assign wire2 = reg1 & reg3;
assign wire3 = reg1 & reg4;
assign wire4 = reg1 & reg5;
```

127 {
```
always@ (posedge CLK or posedge RESET)
  begin
    if (RESET)
        reg1 <= 1b'0
    else
        reg1 <= input
  end
always@ (posedge CLK or posedge RESET)
  begin
    if (RESET)
        reg1_1 <= 1b'0
    else
        reg1_1 <= input
  end
```

128 {
```
assign wire1 = reg1 & reg2;
assign wire2 = reg1_1 & reg3;
assign wire3 = reg1_1 & reg4;
assign wire4 = reg1_1 & reg5;
```

F I G. 1 4
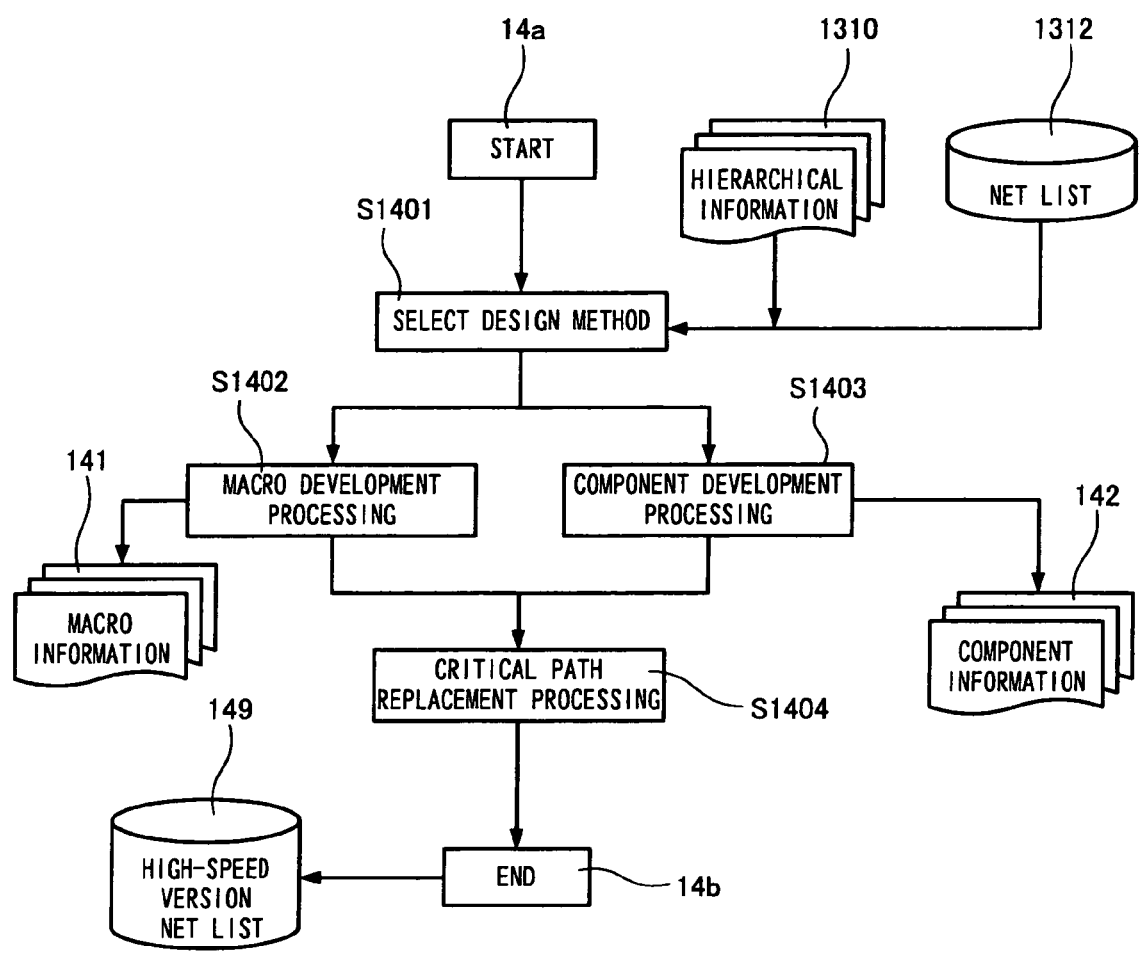

DESIGN METHOD FOR SEMICONDUCTOR INTEGRATED CIRCUIT DEVICE USING PATH ISOLATION

The present application claims priority of Japanese Patent Application JP2004-213693, filed Jul. 22, 2004.

BACKGROUND OF THE INVENTION

1. Field of the Invention

The present invention relates to a design method for a semiconductor integrated circuit device.

2. Description of the Related Art

Recently various functions are integrated in semiconductor integrated circuit devices, and the performance to be demanded is becoming dramatically higher. Generally automatic designing using EDA tools are inferior to full customization designing, where most designing is manually performed, in terms of performance of designed semiconductor integrated circuits. On the other hand, an automatic design flow is demanded for decreasing the design period (TAT), process portability and ease of testing. In these aspects, increasing the performance of semiconductor integrated circuits designed by an automatic design flow using EDA tools is a critical issue.

As a method for increasing the speed for automatic design flow using EDA tools, the optimization of drive capability and the optimization of the number of outputs are used, which are known in the following (1), (2) and (3):

(1) Michel R. C. M. Berkelaar, Jochen A. G Jess, "Gate Sizing in MOS Digital Circuits with Linear Programming", 1990, EDAC'90, [searched on Sep. 8, 2003], (2) Oliver Coudert, et al, "New Algorithms for Gate Sizing: A Comparative Study", 1996, DAC'96, [searched on Sep. 8, 2003], (3) "A Fast Fan-out Optimization Algorithm for Near-Continuous Buffer Libraries", 1998, DAC'98, [searched on Sep. 8, 2003], These technologies are the processings to be executed as optimization processings when the logic synthesis in conventional EDA tools is performed. The optimization of drive capability is a method for minimizing the signal arrival time on a path in a device by adjusting the drive force of the elements constituting a semiconductor integrated circuit device. The optimization of number of outputs, on the other hand, is a method for decreasing the number of the components to be connected to an output of a component using a repeater or buffer when many components are connected, so as to minimize the signal arrival time of a path.

FIG. 17 is a diagram depicting the conventional design method for a semiconductor integrated circuit device. This design method comprises a logic synthesis processing in step S171, a layout optimization processing in step S172, a layout processing in step S173, and a delay calculation processing in step S174. This method includes the necessary processing from the point when RTL, a circuit diagram of the semiconductor integrated circuit device, is created, to when the layout is created. In detail, when the delay calculation processing S174 is executed and it is discerned that the path in the device does not satisfy the desired signal arrival time, the processing returns to step S171 or step S172 or step S173, and redesigning is performed so as to satisfy the desired arrival time.

FIG. 18 is a circuit diagram depicting the semiconductor integrated circuit device designed by the conventional design method, wherein a plurality of components constituting the inside of the semiconductor integrated circuit device and the connection relationship thereof are shown. Components 1, 2 and 3 are elements for holding the logic values inside the circuit. Components 4-10 are components of which the output signals are determined by input signals, such as an AND gate and OR gate. Reference number 11 denotes a combined circuit, which is comprised of components similar to the components 4-10.

When a semiconductor integrated circuit device is designed using a combination of such components, the signal arrival time, when a signal passes through each component, is calculated based on the signal transfer time to be input to each component and other components to be connected to the output. The longest signal arrival time, out of the signal arrival times from the components 1 and 2 to the component 3, determines the performance of the device. In this case, when the path passing through the components 1, 7, 9, 11 and 3 takes the longest signal arrival time, this path determines the performance of the semiconductor integrated circuit device.

This prior art, however, has limitations in increasing performance and in increasing the speed of the semiconductor integrated circuit device.

SUMMARY OF THE INVENTION

With the foregoing in view, it is an object of the present invention to provide a design method for implementing higher performance and higher speed of a semiconductor integrated circuit device. It is another object of the present invention to provide a design method that can be integrated into the automatic design flow using conventional EDA tools and can implement higher performance and higher speed than the conventional technology.

To solve the above problems, the design method for a semiconductor integrated circuit device according to the present invention is characterized in that a path separation is performed for a path having a signal arrival time exceeding the desired value among paths in the device, so that the number of other components to be connected to the output of a component belonging to the path decreases.

By performing separation of a path in this way, the load to be connected to the output of a component decreases and the signal arrival time of the path satisfies the desired signal arrival time, which can improve the performance of the device.

According to another design method for a semiconductor integrated circuit of the present invention, a new component, required for performing path separation, is generated.

In this way higher performance of the device by path separation can be implemented.

According to still another design method for a semiconductor integrated circuit device of the present invention, a component comprising a plurality of output ends with the same logic, one or some ends to be connected to a specific path and other ends to be connected to the other paths, is generated to perform the path separation within the components.

In this way the load of the output of a component is decreased by the path separation and higher performance of the device can be implemented.

According to still another design method for a semiconductor integrated circuit device of the present invention, the path separation is performed by generating another component having an equivalent function as a component belonging to the path having a signal arrival time exceeding a desired value by copying, and connecting only a component in a subsequent stage belonging to the path having a signal arrival time exceeding a desired value to the output of the component or the other component.

In this way the number of components in the next stage to be connected to the output of the component can be 1, and higher performance of the device can be implemented by the decrease of the load of the output.

According to still another design method for a semiconductor integrated circuit device, the path separation is performed by connecting the output of a component belonging to the path having a signal arrival time exceeding a desired value to a component in a subsequent stage on the path having a signal arrival time exceeding a desired value and a component having a small input load, and connecting a component or components in a subsequent stage on a path other than the path having a signal arrival time exceeding a desired value to the output of the component with a small input load.

In this way the number of components in a subsequent stage to be connected to the output of the component can be 2, and higher performance of the device can be implemented by the decrease of the load of the output.

According to still another design method for a semiconductor integrated circuit device of the present invention, the path separation is performed by replacing a component belonging to the path have a signal arrival time exceeding a desired value with a component comprising a plurality of output ends with the same logic, one or some to be connected to the path have a signal arrival time exceeding a desired value, and others to be connected to the other paths.

In this way the number of components in the next stage to be connected to the output of the component can be 1, and higher performance of the device can be implemented by the decrease of the load of the output.

According to still another design method for a semiconductor integrated circuit device of the present invention, the path separation is performed for a part of or all of the components belonging to the path having a signal arrival time exceeding a desired value.

In this way the load of the output of the components is decreased by the path separation and higher performance of the device can be implemented.

According to still another design method for a semiconductor integrated circuit device of the present invention, when the path separation is performed by copying a component or components, a component at the start point side of the path is selected as a first copying target component, and this selected component is copied, and a path is separated with a connection destination of the output of this selected component as another component at the end of the point side of the path, then the other component to be connected to the output of the selected component is copied and a path is separated with the connection destination of the output of this component as still another component at the end point side of the path, and the path separation is sequentially performed up to the end point side of the path until the signal arrival time no longer exceeds the desired value.

In this way the increase of the signal arrival time in a path other than the target path can be suppressed by copying the components, and it becomes unnecessary to perform path separation processing for all the components included in the path, so higher performance of the device can be implemented more efficiently without unnecessarily increasing the area.

According to still another design method for a semiconductor integrated circuit device of the present invention, if the signal arrival time of another path, connected to an input that does not belong to the path having an arrival time exceeding a desired value, among the inputs of the components copied for a path separation, exceeds a desired value by separating the path, path separation is performed by copying the components belonging to the other path that have a signal arrival time exceeding the desired value.

In this way higher performance of the device can be implemented while preventing the new generation of a path that does not satisfy a desired signal arrival time by path separation.

According to still another design method for a semiconductor integrated circuit device of the present invention, when a path separation is performed for a plurality of components belonging to a path having a signal arrival time exceeding a desired value, a path separation is performed based on the information on a signal arrival time of the circuit and the number of connections of the other components to be connected to the output of each component, sequentially from a component having a higher number of connections among the plurality of components.

In this way the ratio of the decrease of the loads connected to the output of the components increases, so the signal arrival time can be decreased efficiently, and higher performance of the device can be implemented.

According to still another design method for a semiconductor integrated circuit device of the present invention, the path separation is performed for the path having a signal arrival time exceeding a desired value for a circuit written in RTL based on information on the signal arrival time of the semiconductor integrated circuit device, so as to generate a new circuit written in RTL.

In this way path separation is performed upstream of designing, and path separation is performed for a minimum necessary portion based on the information of the circuit, so a high-speed effect can be implemented over a wide range of the circuit. Also the path separation can be performed in a circuit written in RTL where the circuit performance is improved, so an obvious increase in speed becomes possible at logic synthesis, and a circuit with higher performance can be provided when the circuit is reused.

According to still another design method for a semiconductor integrated circuit device of the present invention is the above mentioned method, in a net list generated by a logic synthesis device, a path separation is performed for components belonging to a path having a signal arrival time exceeding a desired value based on information on the signal arrival time of the circuit, so as to generate a new net list.

In this way locations more appropriate than the case of correcting a circuit written in RTL can be corrected for a net list optimized by a general purpose logic synthesis device, and also an easier correction than the case of correcting layout is possible. By this, higher performance can be implemented compared with a circuit generated by a conventional logic synthesis device.

According to still another design method for a semiconductor integrated circuit device of the present invention, in a net list generated by a logic synthesis device, the path separation is performed for components belonging to a path having a signal arrival time exceeding a desired value based on the information on the signal arrival time of the circuit, and the separated path is generated as one functional block hierarchy.

In this way a separated path can be handled as one functional block hierarchy, and the physical design of the path can be performed efficiently.

According to still another design method for a semiconductor integrated circuit device of the present invention, in a net list generated by a logic synthesis device, the path separation is performed for components belonging to a path having a signal arrival time exceeding a desired value based on the information on the signal arrival time of the circuit, and the components of the separated path are laid out within a certain area by layout optimization processing, and a specific attribute for laying out the components close to each other is attached.

In this way the separated paths can be laid out close to each other, and the wiring connecting the components becomes shorter, so the signal arrival time of a path can be decreased and higher performance of the device can be implemented.

According to still another design method for a semiconductor integrated circuit device of the present invention, in a net list generated by the logic synthesis device, the path separation is performed for components belonging to a path having a signal arrival time exceeding a desired value based on the information on the signal arrival time of the circuit, and the separated path is generated as one macro, and is replaced with the path.

In this way by generating the separated path as a macro optimized at the transistor level by high-speed customization design, the circuit generated by design using components can be replaced with a higher speed circuit, and higher performance of the device can be implemented.

According to still another design method for a semiconductor integrated circuit device of the present invention, in a net list generated by the logic synthesis device, the path separation is performed for components belonging to a path having a signal arrival time exceeding a desired value based on the information on the signal arrival time of the circuit, and the separated path is generated as one component of a structure where the components belonging to the path having a signal arrival time exceeding a desired value are adjacent to each other, and the separated path is replaced with the generated one component.

In this way the separated path can be handled as one component and the speed of the path can be increased, and since this method can be used in the automatic design flow, higher performance of the circuit can be implemented efficiently when many paths, which do not satisfy a desired signal arrival time, exist.

According to still another design method for a semiconductor integrated circuit device of the present invention, in a net list generated by the logic synthesis device, the path separation is performed for components belonging to a path having a signal arrival time exceeding a desired value based on the information on the signal arrival time of the circuit, a part of the separated path is implemented by a macro based on a predetermined standard, and another part thereof is implemented as components.

In this way a path of which a violation is major among the paths which do not satisfy a desired signal arrival time can be implemented as a macro taking a long development period, and a path of which a violation is relatively minor can be implemented as one component making the development period shorter, so higher performance can be implemented efficiently balancing development period and performance.

According to still another design method for a semiconductor integrated circuit device of the present invention, in a design circuit diagram including the physical information generated by a layout optimization device and a layout device, the path separation is performed for a component belonging to a path having a signal arrival time exceeding a desired value based on the signal arrival time information of the circuit, the layout and wiring information, and the capacity and resistance values to be connected to the output of the components, so as to generate a net list and new layout and wiring information.

In this way the path separation can be performed considering the wiring capacity and wiring resistance, extracting the layout and wiring information from the layout, and by focusing on the capacity and resistance, higher performance can be implemented more efficiently than the case of performing separation by the number of connections.

According to still another design method for a semiconductor integrated circuit device of the present invention, wherein the path separation is performed for components belonging to a path having a signal arrival time exceeding a desired value by copying the component and connecting the output thereof to another component, and the component of the separated path is laid out within a certain area.

In this way the components can be laid out close to each other, that is, the separated paths can be laid out at a physically close location and the wiring connecting the components can be shorter, so the signal arrival time of a path can be decreased, and higher performance of the device can be implemented.

According to still another design method for a semiconductor integrated circuit device of the present invention, wherein the path separation is performed for components belonging to a path having a signal arrival time exceeding a desired value by copying the component and connecting the output thereof to another component, and the separated path is generated as one macro, and is replaced with the separated path.

In this way a circuit generated by design using components can be replaced with a faster circuit by generating the separated path as a macro and applying high-speed customization design, and higher performance of the circuit can be implemented during layout.

According to still another design method for a semiconductor integrated circuit device of the present invention, in a design circuit diagram including the physical information generated by a layout optimization device and a layout device, the path separation is performed for a path having a signal arrival time exceeding a desired value based on the signal arrival time information of the circuit, the layout and wiring information, and the capacity and resistance values to be connected to the output of the components, the separated path is generated as one component of a structure where the components belonging to the path are adjacent to each other, and the generated component is replaced with the separated path.

In this way the path separation and the replacement of the separated path with one component having the function of the path become possible in the layout device, and since the separated path is generated as one component, the signal arrival time of the path is decreased and higher performance of the device can be implemented.

According to still another design method for a semiconductor integrated circuit device of the present invention, at logic synthesis by a logic synthesis device and at optimization after the logic synthesis, the path separation is performed for components belonging to a path having a signal arrival time exceeding a desired value, the path separation being performed within the components, using components comprising a plurality of output ends with the same logic, one or some to be connected to a specific path and others to be connected to the other paths based on the information on the signal arrival time of the circuit.

In this way the path separation becomes possible in the logic synthesis processing and in the optimization processing performed by the logic synthesis device, and higher performance than the current status can be implemented using conventional tools.

According to still another design method for a semiconductor integrated circuit device of the present invention, at logic synthesis by a logic synthesis device or at optimization after the logic synthesis, the path separation is performed using a component comprising a plurality of output ends with the same logic, one or some to be connected to a specific path and others to be connected to the other paths, and attaching a specific attribute to connect only one logic element to at least one of the output ends with the same logic.

In this way the restrictions on the number of connections of the output ends of the component are explicitly provided to the logic synthesis device, so path separation by conventional tools becomes possible, and the performance of the device can be improved.

According to still another design method for a semiconductor integrated circuit device of the present invention, at logic synthesis by a logic synthesis device and at optimization after the logic synthesis, the path separation is performed using a component comprising a plurality of output ends with the same logic, one or some to be connected to a specific path and others to be connected to the other paths, and attaching a specific attribute to connect only one component to at least one of the output ends with the same logic, so as to connect only the components belonging to a path having a signal arrival time exceeding a desired value to one output end and connect the other components to the other output end.

In this way the path separation becomes possible in logic synthesis processing and optimization processing executed by the logic synthesis device, and performance higher than the current status can be implemented using conventional tools, and by providing the restrictions on the number of connections of the output ends of the components explicitly to the logic synthesis device, path separation by conventional tools becomes possible and performance of the device can be improved.

As described above, according to the design method for a semiconductor integrated circuit device of the present invention, the signal arrival time of a path in a device can be decreased by applying this method as part of the conventional design flow, and higher performance and higher speed of the semiconductor integrated circuit device can be implemented.

BRIEF DESCRIPTION OF THE DRAWINGS

FIG. 4 is a diagram depicting another example of a circuit where the design method of the present invention is applied;

FIG. 12A-FIG. 12D show examples in which the present invention is applied to RTL;

FIG. 14 is a flow chart depicting the design procedure after the present invention is applied to a net list;

DESCRIPTION OF THE PREFERRED EMBODIMENTS

Embodiments of the present invention will now be described with reference to the drawings.

Figure 1:
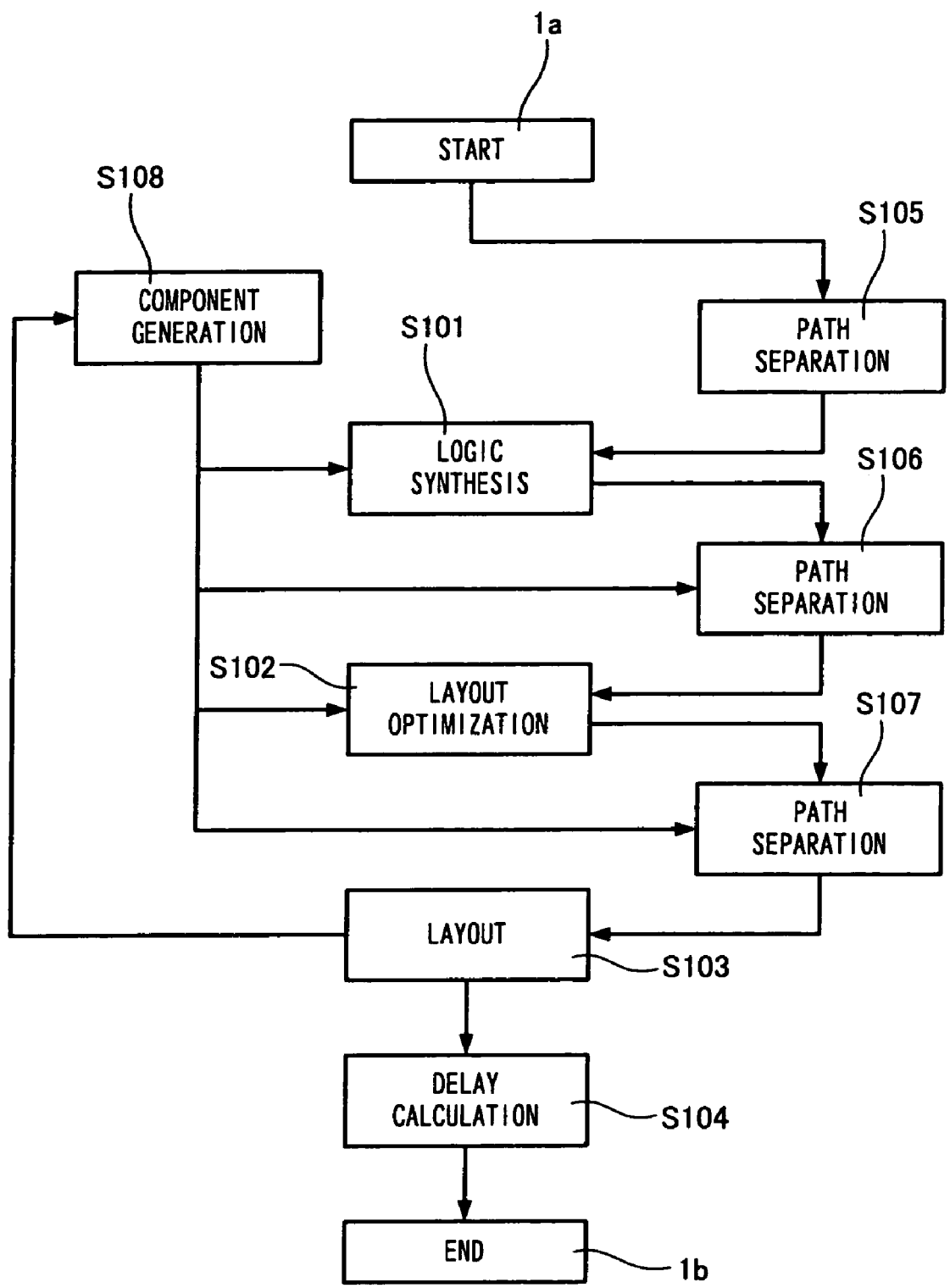
FIG. 1 is a flow chart depicting an embodiment of the design method for a semiconductor integrated circuit device according to the present invention.
Figure 17:
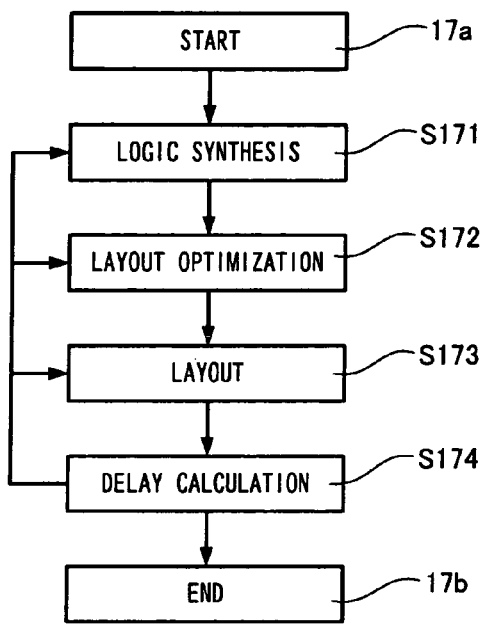
FIG. 17 is a flow chart depicting an example of a conventional design method for a semiconductor integrated circuit device.

FIG. 1 is a flow chart depicting an embodiment of the design method for a semiconductor integrated circuit device according to the present invention. FIG. 1 depicts a design method comprising the processing proposed by the present invention in addition to the conventional design method described with reference to FIG. 17. Specifically a path separation processing is executed as step S105 before a logic synthesis processing in step S101, a path separation processing is executed in step S106 after step S101, and a path separation processing is executed as step S107 after a layout optimization processing in step S102. In the design method in FIG. 1, a component generation processing 108 for generating dedicated components required for the path separation processings is also executed.

Now the path separation processings S105, S106 and S107 will be described in detail.

Figure 2A:
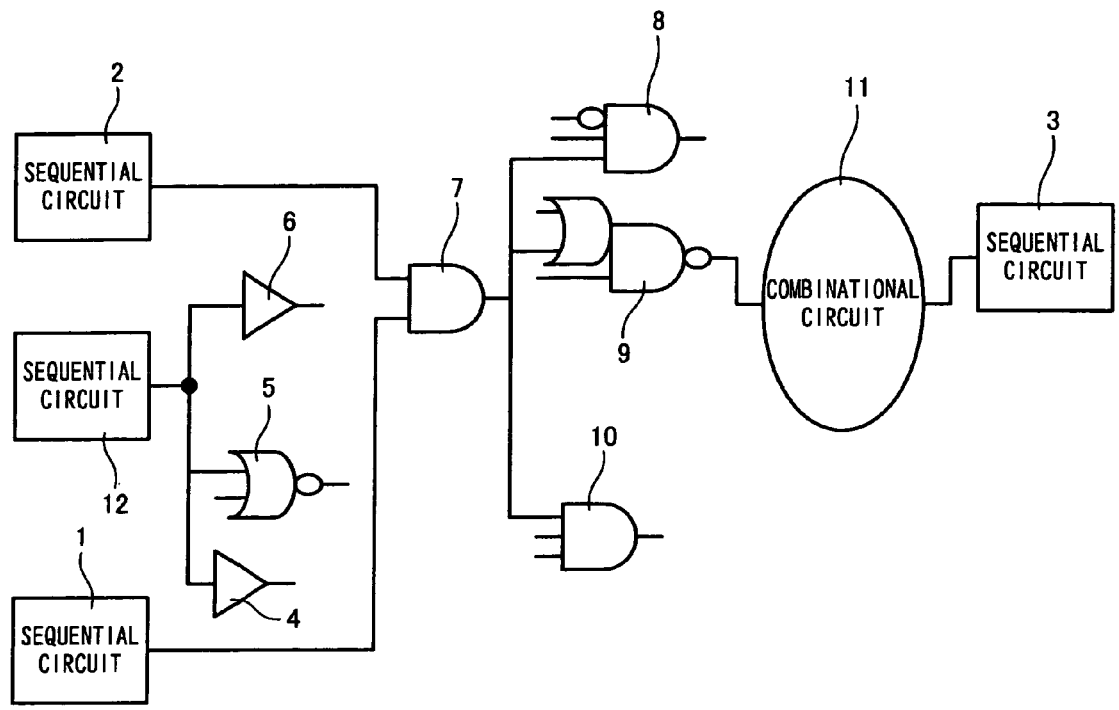
FIG. 2A and FIG. 2B are diagrams depicting a circuit where the design method of the present invention is applied.
Figure 2B:
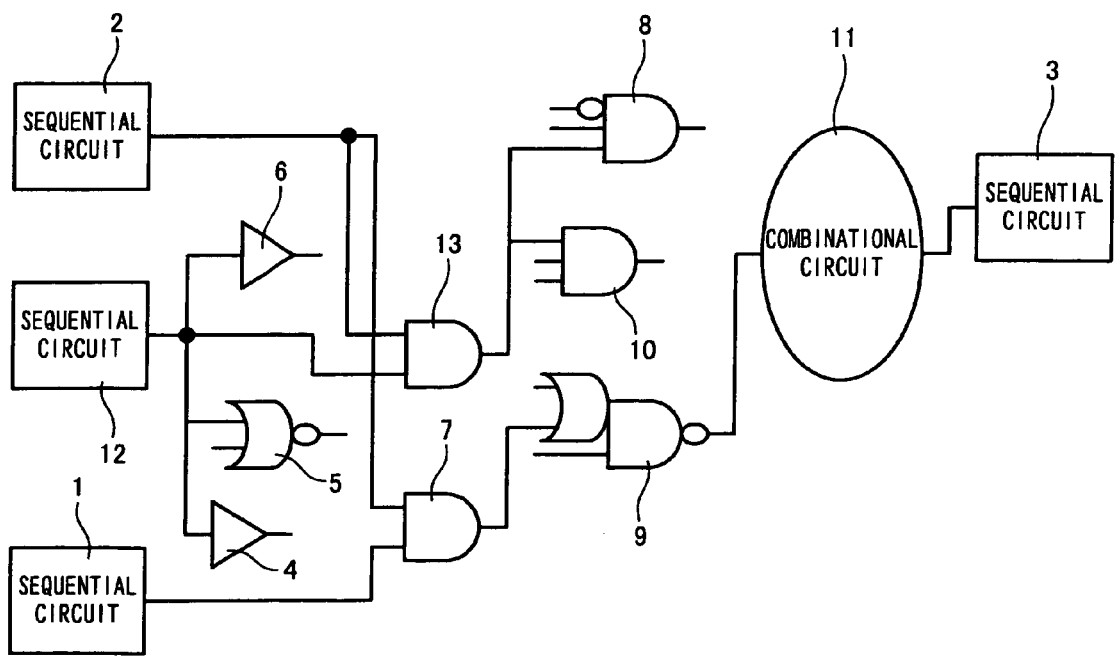
Figure 18:
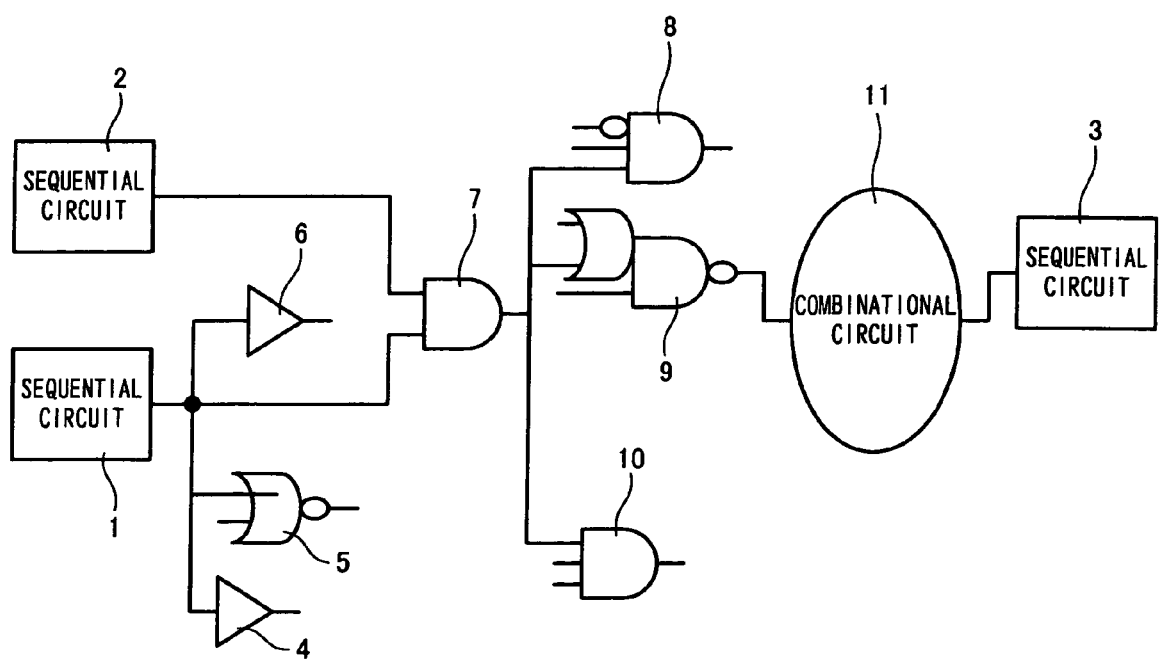
FIG. 18 is a diagram depicting a circuit generated by the conventional design flow.

FIG. 2A and FIG. 2B are circuit diagrams depicting a design method common to the path separation processings S105, S106 and S107 in FIG. 1. The circuits in FIG. 2A and FIG. 2B are similar to the conventional circuit shown in FIG. 18, but as FIG. 2A shows, the component 12, identical with the component 1, holding the logic value in the circuit, is created, and the components 4, 5 and 6, which are connected to the component 1 in the conventional circuit in FIG. 18, are connected to the component 12. By this, only one component, component 7, is connected to the component 1, so the signal arrival time from the component 1 to the component 7 decreases, and the above mentioned maximum signal arrival time decreases, therefore performance of the semiconductor integrated circuit device can be improved.

In this way a component belonging to a path which does not satisfy the desired arrival time is copied, and the number of other components to be connected to the output of this component is decreased, therefore the capacity can be small, the signal arrival time can be decreased, and higher performance of the device can be implemented.

If the path from the component 1 to the component 3 in the circuit shown in FIG. 2A does not satisfy the desired signal arrival time, then as shown in FIG. 2B, the component 13, identical with the component 7, is created, and the components 8 and 10 which were connected to the output of the component 7 are connected to the output of the component 13. The input of the component 13 is connected to the component 2 and component 12. By this, the signal arrival time from the component 2 to the component 7 and the component 13 increases for a predetermined amount, but if the signal arrival time of the path from the component 2 is shorter than the maximum signal arrival time of the circuit for the predetermined amount, then the path from the component 2 satisfies the desired signal arrival time. The connection destination of the output of the component 7, on the other hand, is only the component 9, that is the number of connections is one, and the signal arrival time from the component 7 to the component 9 decreases compared with the circuit in FIG. 2A. As a result, the maximum signal arrival time of the circuit can be decreased.

In the same way in the component 9 and the combinational circuit 11, the path separation is performed in the same way for a part or for all of the components belonging to form the path from the component 1 to the path from the component 3, then the maximum signal arrival time of the circuit decreases, and performance of the semiconductor integrated circuit device can be improved.

Figure 3A:
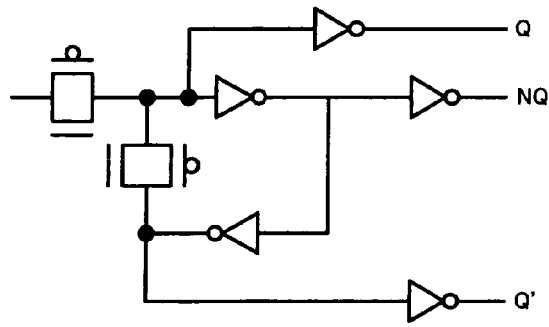
FIG. 3A and FIG. 3B are diagrams depicting an example of a circuit of dedicated components which are required for the design method of the present invention.
Figure 3B:
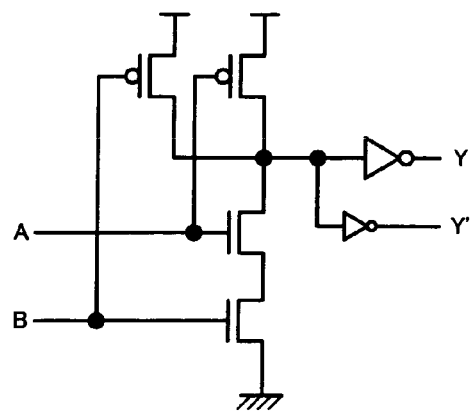
Figure 3C:
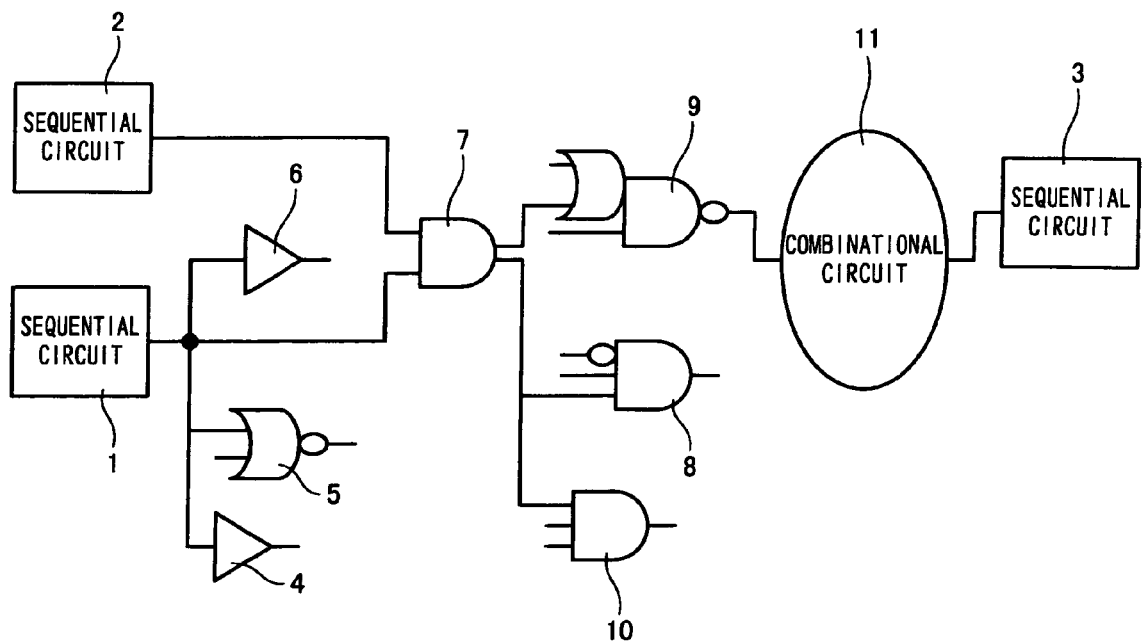
FIG. 3C is a diagram depicting an example of a circuit where the design method of the present invention is applied using the circuits in FIG. 3A and FIG. 3B.

FIG. 3A-FIG. 3C show another design method common to the path separation processings S105, S106 and S107 in FIG. 1. FIG. 3A and FIG. 3B show an example of the structure of dedicated cells required for the path separation processing, which are generated by the component generation processing S108 in FIG. 1. Specifically, the component shown in FIG. 3A is an example of a dedicated flip-flop. This component comprises terminal Q' in addition to the normal terminals Q and NQ. By controlling such that only one component is connected to the Q terminal out of these terminals, the path separation is possible within the components, and higher performance of the device can be implemented. The component shown in FIG. 3B is an AND circuit, where only one component is connected to the Y terminal, and another component or components are connected to the Y' terminal, then the path separation can be implemented, and higher performance of the device can be implemented.

FIG. 3A and FIG. 3B show examples of the dedicated components, but in the same way, components with other logic can be generated.

In this way a component has two output terminals, and another component is connected to one terminal and one or more other components is/are connected to the other, then the components belonging to a path which does not satisfy a desired delay time can be connected to the terminal with priority. Since these components can be used appropriately, higher performance of the circuit can be implemented.

FIG. 3C shows a circuit structure when the path separation was performed using the dedicated cells in the circuit in FIG. 18. The component 7, which belongs to a path having the longest signal arrival time in the device, is replaced with the dedicated component in FIG. 3B, the component 9 is connected to the Y terminal shown in FIG. 3B, and the components 8 and 10 are connected to the Y' terminal, then the signal arrival time from the component 7 to the component 9 decreases.

In this way by performing the path separation within components, performance of the device can be improved.

FIG. 4 shows still another design method which is common to the path separation processings S105, S106 and S107 in FIG. 1. Compared with the conventional circuit shown in FIG. 18, the components 14 and 15 are generated, the output of the component 1 is connected to the inputs of the component 7 and the component 14, the output of the component 14 is connected to the input of the component 15, and the output of the component 15 is connected to the components 4, 5 and 6. The components 14 and 15 have a logic to invert the logic value of the signal, and the logic value of the output signal of the component 1 and the logic value of the output signal of the component 15 are equivalent. For the component 14, a component with a small input capacity is selected, and for the component 15, an component with a drive force appropriate for driving the components 4, 5 and 6 is selected. Because of this, only two components, 7 and 14, are connected to the component 1, and since the input capacity of the component 14 is small, the signal arrival time from the component 1 to the component 7 can be decreased.

By separating the path in this way, the maximum signal arrival time of the circuit decreases, so performance of the semiconductor integrated circuit device can be implemented.

After the processings for generating the components 14 and 15 are performed, if the path from the component 1 to the component 3 does not satisfy the desired signal arrival time, the components 16 and 17 are created for the output of the component 7 in the same selection method as the components 14 and 15, and the components 7, 9, 16, 17, 8 and 10 are connected, as shown in FIG. 4.

By sequentially separating the path in this way based on the delay time of the path, the desired arrival time is satisfied by the addition of the minimum required components, and performance of the semiconductor integrated circuit device can be improved.

Figure 5:
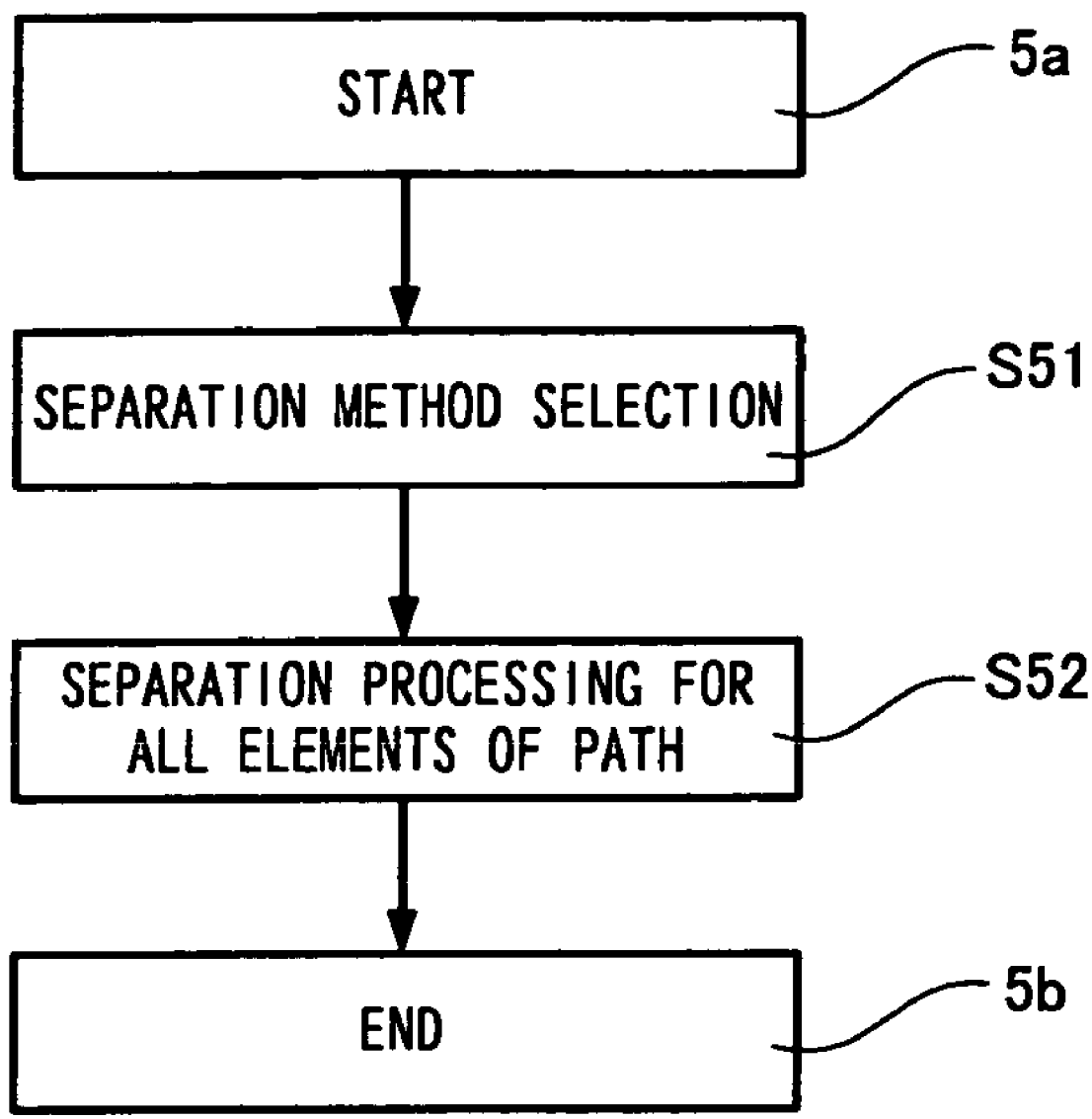
FIG. 5 is a flow chart depicting the path separation processing based on the present invention.

Using the separation methods shown in FIGS. 2A and 2B, FIGS. 3A to 3C, and FIG. 4, a path can be separated as shown in FIG. 5. FIG. 5 shows a design method common to the path separation processings S105, S106 and S107 in FIG. 1, where one method of the path separation procedure is shown. Here in step S51, a method for separating a path is selected from a method for copying the components in FIG. 2, a method for having a dedicated component which has two output terminals in FIG. 3, and a method for using a component with small input capacity in FIG. 4. And in step S52, the path separation is performed for all the components belonging to the path which does not satisfy the desired signal arrival time.

By separating the path in this way the separation processing can be performed at high-speed, and higher performance of the device can be implemented in a short period.

Figure 6:
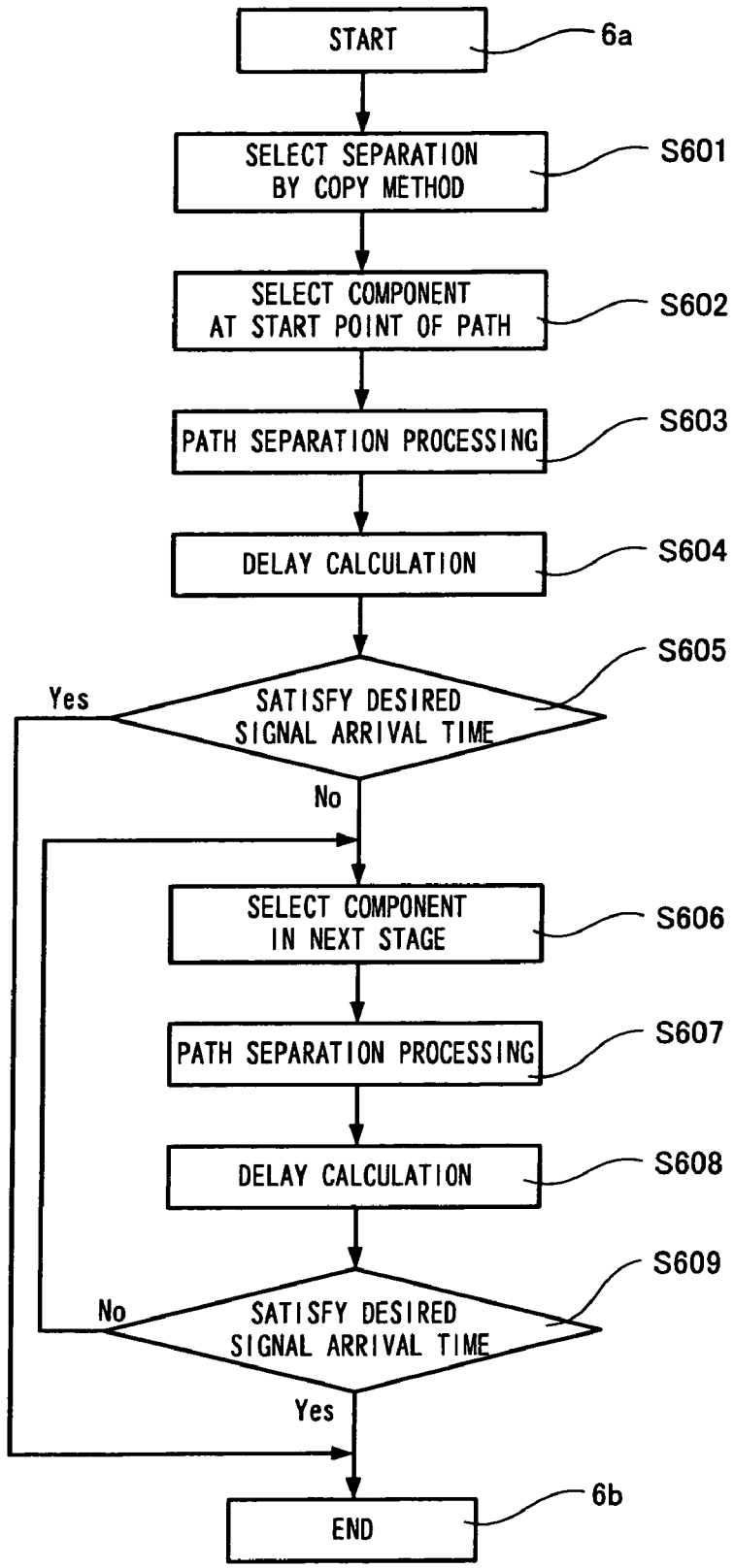
FIG. 6 is a flow chart depicting an example of the path separation processing based on the present invention.

FIG. 6 shows one procedure of path separation based on the present invention. Here the path separation is performed according to the following procedure if the path separation method by copying the components in FIG. 2 is selected in step S51 for selecting the separation method in FIG. 5.

At first the path separation by copying is selected in step S601, and then a component at the start point of the path is selected in step S602. Then in step S603 the path separation processing is performed for this component, and the component is copied and the output connection is changed. Then in step S604, the delay calculation is performed and the signal arrival time of the target path is calculated. And in step S605 the signal arrival time is verified, and the processing ends if the signal arrival time of the path satisfies the desired arrival time. If the desired arrival time is not satisfied in step S605, the processing moves to step S606. In step S606, the component in the next stage, which is connected to the output of the component for which separation was performed in step S603, is selected as the path separation target. Then in step S607, the path separation processing is performed for the component selected in step S606. Also in step S608, the delay calculation is performed. In step S609, the signal arrival time is verified, and the processing ends if the desired arrival time is satisfied. If the desired arrival time is not satisfied, the processing returns to step S606 and the same processing is repeated.

By using the method of sequentially performing path separation from the component at the start point of the path to the component at the end point, the path separation can be performed only for the minimum necessary number of components to satisfy the desired arrival time, and higher performance can be implemented while suppressing an area increase of the device. Also compared with the case of performing the path separation first on the component located in the middle of the path, if the component at the start point is copied, influence on the component in the previous stage of the component is smaller, so higher performance of the device can be implemented while suppressing influence on the path other than the separation path.

Figure 7:
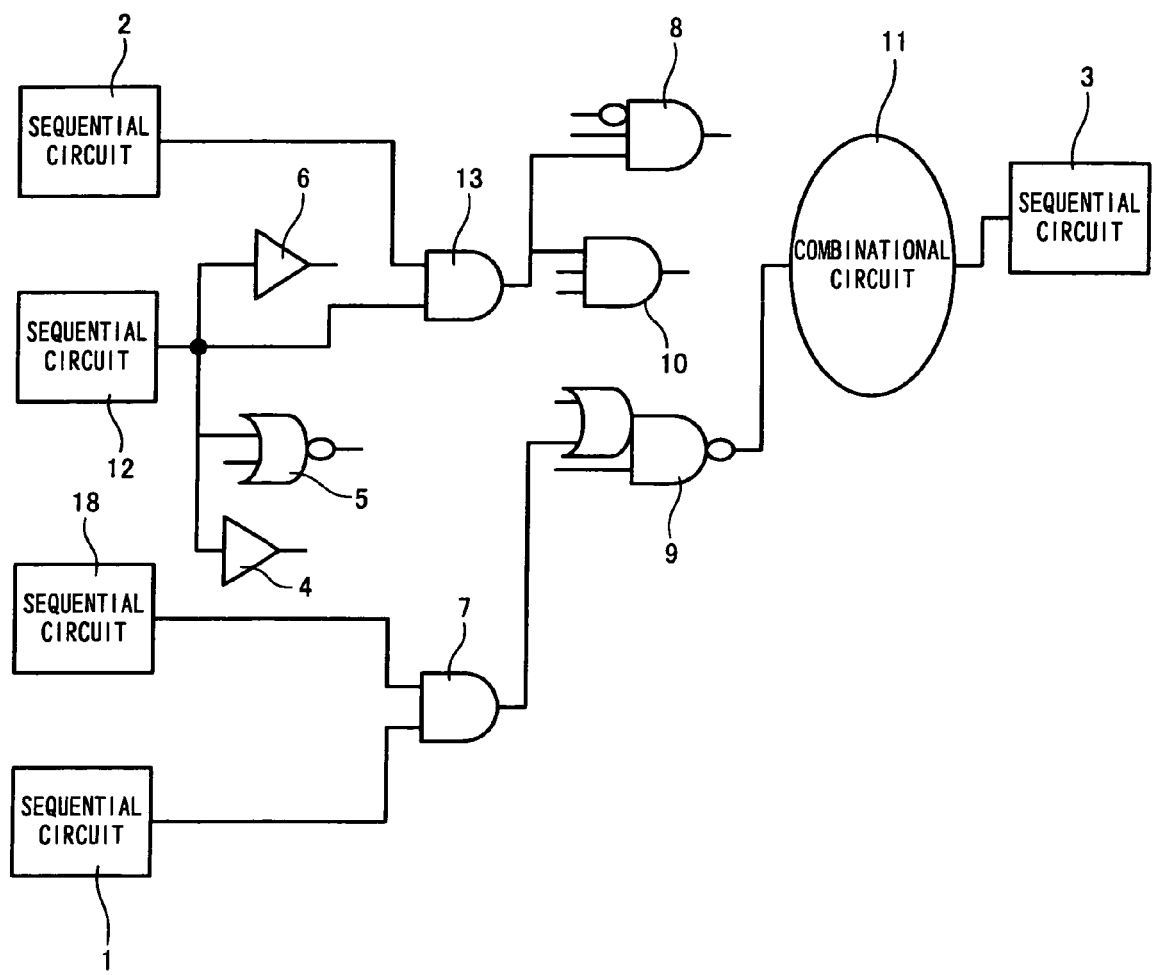
FIG. 7 is a diagram depicting a circuit where the path separation was performed according to the flow in FIG. 6.

FIG. 7 shows a circuit where a component 18 is generated by copying the component 2 in the circuit in FIG. 2B, and the input terminal connected to the component 2, among the inputs of the component 7, is reconnected to the component 18.

By performing the processing of copying and reconnecting in the same way as above for all the components connected to the components for which path connection was performed by copying, influence of copying of components on another path can be suppressed, and higher performance of the device can be implemented more efficiently.

Figure 8:
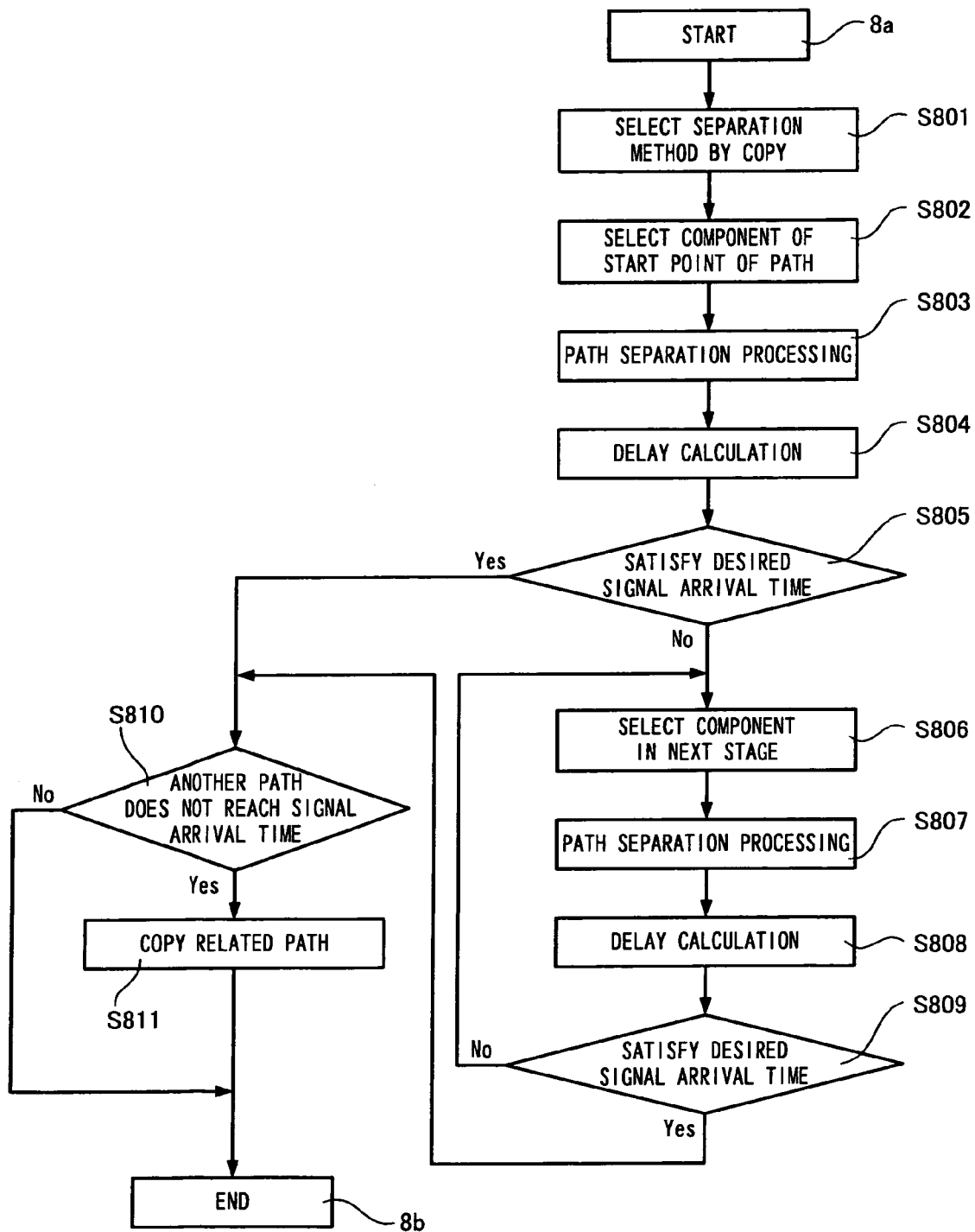
FIG. 8 is a flow chart depicting the processing where the path separation in FIG. 7 is added to the flow in FIG. 6.

FIG. 8 is a flow chart depicting the processing where the path separation based on FIG. 7 is added to the procedure in FIG. 6. In step S51 for selecting the separation method in FIG. 5, the path separation is performed according to the following procedure if the path separation method by copying components is selected. Specifically after the path selection by copying is selected in step S801, the component at the start point of the path is selected in step S802. Then in step S803, the path separation is performed for this selected component, and the component is copied, and the output connection is changed. Then in step S804, the delay calculation is performed and the signal arrival time of the target path is calculated. The signal arrival time is verified in step S805, and the processing moves to step S810 if the signal arrival time of the path satisfies the desired arrival time. If the desired arrival time is not satisfied, the processing moves to step S806. In step S806, a component in the next stage, to be connected to the output of the component for which path separation was performed in step S803, is selected as the path separation target. In step S807, the path separation processing is performed for the component selected in step S806. And the delay calculation is performed in step S808. Also the signal arrival time is verified in step S809, and if the desired arrival time is not satisfied, the processing returns to step S806 and the same processing is repeated. If the signal arrival time of the path satisfies the desired arrival time in step S809, the processing moves to step S810. In step S810, it is verified whether this path separation causes other paths related to the separated path to not satisfy the desired arrival time. The processing ends if the other paths satisfy the desired arrival time. If the other paths do not satisfy the desired delay time in step S810, the processing moves to step S811, and the components are copied and connection is changed, as described based on FIG. 7, and the processing ends.

Figure 9A:
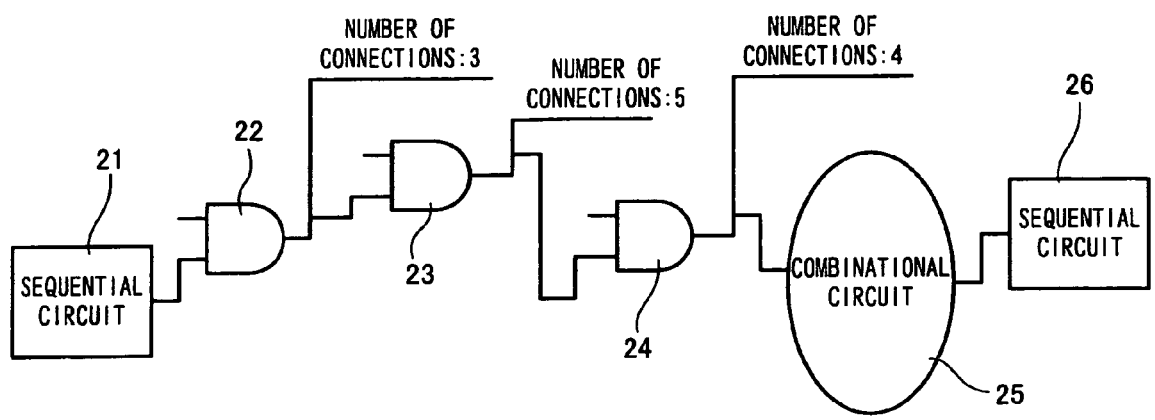
FIG. 9A and FIG. 9B are diagrams depicting another circuit where the design method of the present invention is applied.
Figure 9B:
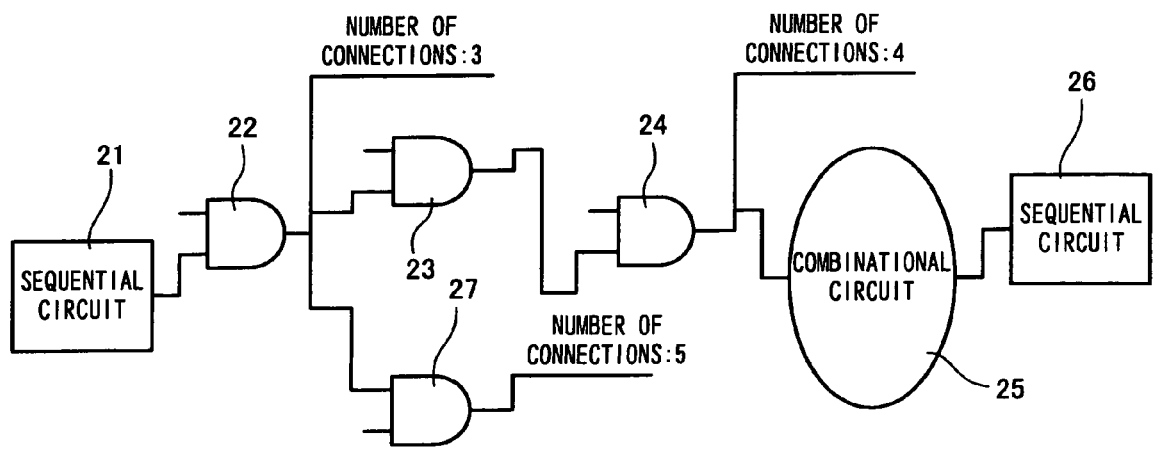

FIG. 9A and FIG. 9B show still another design method common to the path separation processings S105, S106 and S107 in FIG. 1. The connection diagram in FIG. 9A shows a path which does not satisfy the desired signal arrival time in the semiconductor integrated circuit device, and the components 21, 22, 23, 24 and 26 and the combinational circuit 25 belong to this path. The component 23 and three other components are connected to the output of the component 22. In the same way, the component 24 and five other components are connected to the output of the component 23, and the combinational circuit 25 and four components are connected to the output of the component 24. And at most three components are connected to the output of the component in the combinational circuit 25.

To create identical components and to select components for which the number of connections are changed, the component 23, of which the number of components to be connected to the output is greatest, is selected. As shown in FIG. 9B, the component 23 is copied and created into the component 27, and a circuit is designed such that only the component 24 is connected to the output of the component 23, and five other components are connected to the output of the component 27.

By this, the effect to decrease the number of components to be connected to the output of the component becomes highest, and the amount of decreasing the signal arrival time also becomes large. Therefore the performance of the semiconductor integrated circuit device can be improved efficiently.

Figure 10:
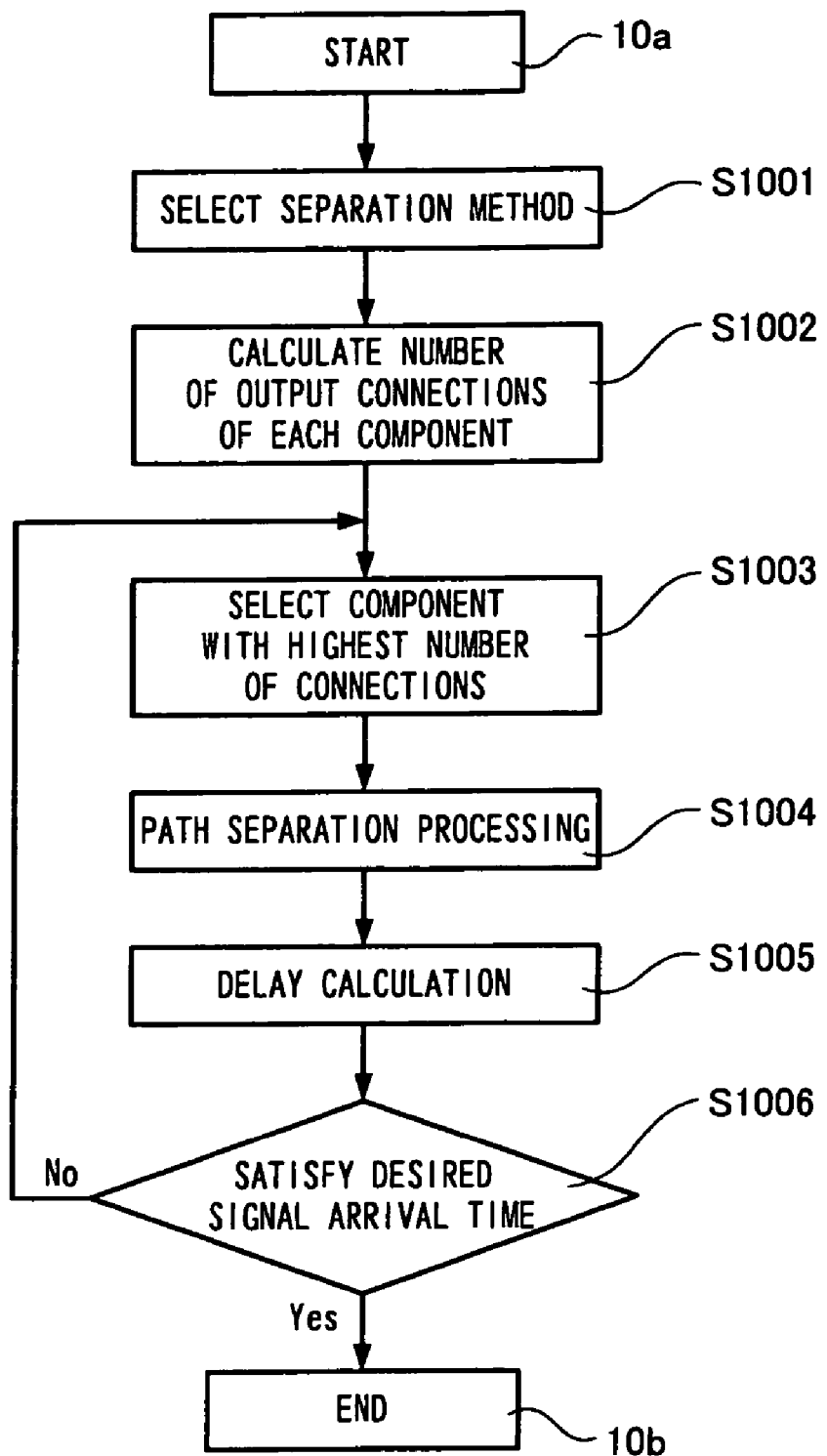
FIG. 10 is a flow chart depicting an example of the path separation procedure in FIG. 9A and FIG. 9B.

FIG. 10 shows an example of the path separation procedure described based on FIG. 9A and FIG. 9B. In step S1001, a path separation method is selected from the method for copying components, the method for using a dedicated component having two output terminals, and the method for using components with small input capacity. Then in Step S1002, the number of connections of the outputs of all the components belonging to the separation target path is calculated. Then in step S1003, a component where the highest number of components are connected to the output thereof is selected as a candidate for which the path separation processing is performed. Then in step S1004, the path separation processing is performed for the components selected in step S1003 using the method selected in step S1001. Then the delay is calculated in step S1005, and step S1006 verifies whether the signal arrival time of the path for which path separation processing was performed satisfies the desired arrival time. If the desired arrival time is not satisfied, the processing returns to step S1003, and the same processing is repeated. The processing ends if the desired arrival time is satisfied.

Figure 11:
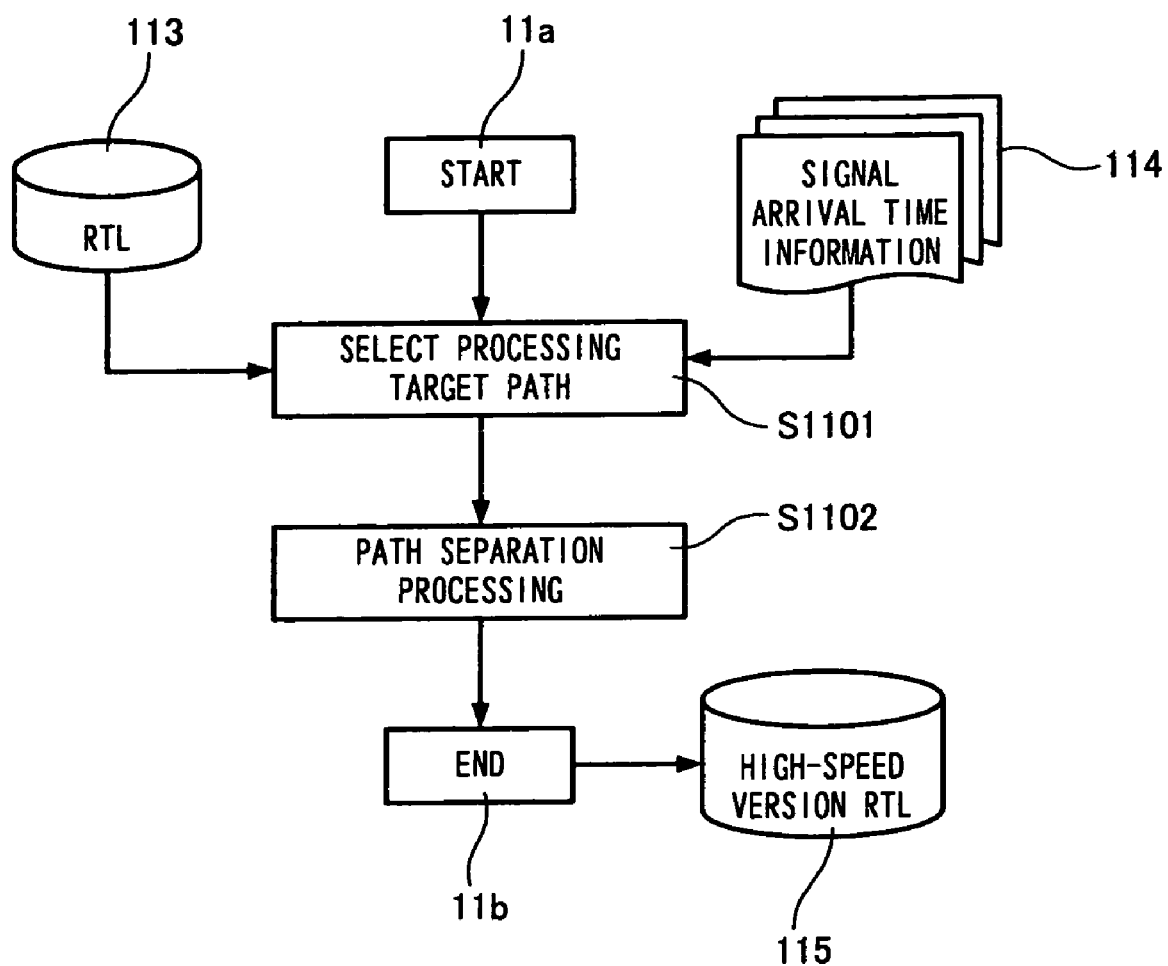
FIG. 11 is a flow chart depicting a procedure to apply the present invention to RTL.

FIG. 11 shows a design method in the path separation processing S105 in FIG. 1, and is an example when the path separation is performed for a design circuit diagram written in RTL. Specifically when the processing target is selected in step S1101, RTL 113 and the signal arrival time information 114 of the circuit are used. The signal arrival time information may be information obtained from the delay calculation, which is performed after logic synthesis, or information after layout. The path separation processing is performed for a path which does not satisfy the desired signal arrival time in step S1102 based on the signal arrival time information, and the processing ends. Reference numeral 115 denotes the acquired high-speed version RTL.

In this way the performance of a circuit written in RTL can be improved, and an RTL with higher performance can be provided when the circuit is used again.

FIG. 12A-FIG. 12D are RTLs describing the circuit of the semiconductor integrated circuit device. FIG. 12A shows an RTL before processing. Signals wire1, wire2, wire3 and wire4 are the ANDs of the signal reg1 and each of the signals reg2, reg3, reg4 and reg5. In this circuit the path passing through the signal reg1 to wire1 is the path that does not satisfy the desired arrival time according to the circuit information or the signal arrival time information, and is a target of the path separation processing.

FIG. 12B shows an RTL after the path separation was performed using a component with small input capacity. The description 122 in FIG. 12B is the description 121 in FIG. 12A which was changed. A component U1 with small input capacity and component U2 with relatively high drive force are added, signal reg1 is connected to the input of the component U1, and the component U1 and the component U2 are connected with the signal wire1_1. Also the signal wire1_2 is connected to the output of the component U2, and the AND of the wire1_2 and each of the signals reg3, reg4 and reg5 become signal wire2, wire3 and wire4. By changing in this way, only the component which is an AND with reg2, and the component U1 with small input capacity are connected to the signal reg1, so the delay time of the path which passes from signal reg1 to wire1 is decreased, and higher performance of the device can be implemented.

FIG. 12C shows an RTL after the path separation was performed, in which a component with small input capacity is defined and used as one hierarchy. Among the above mentioned descriptions 122 in the circuit in FIG. 12B, the portions on the descriptions of U1 and U2 are changed to the descriptions 123 and 124 in FIG. 12C. By this, U1 and U2 in the descriptions 122 are newly defined as U2_1 and U2_2 in the functional block hierarchy buf1, the signal reg1 is connected to the input of the hierarchy buf1, and the signal wire1_1 is connected to the output. The AND of the signal wire1_1 and each of the signals reg2, reg3 and reg4 are connected to the signals wire2, wire3 and wire4 respectively. In this way, only the component which is the AND with reg2, and the component U1 with small input capacity are connected to the signal reg1. So the delay time of the path passing from the signal reg1 to the wire1 is decreased, and higher performance of the device can be implemented. Also by defining the functional logic block hierarchy buf1, a plurality of portions can be used again to perform the same path separation, which makes designing efficient.

FIG. 12D shows an example when the path separation is performed by copying a component. The component of description 125 is described and copied as a description 127. The signal reg1 is copied and reg1_1 is generated. The description 126 is changed to 128. The AND of the signals reg1 and reg2 is connected to the signal wire1. The AND of the signal reg1_1 and each of the signals reg2, reg3 and reg4 are connected to the signals wire2, wire3 and wire4 respectively. By changing such a way, the connection destination of the signal reg1 becomes only one component, that is the AND of reg1 and reg2, and thus the signal arrival time from signal reg1 to signal wire1 is decreased, and higher performance of the device can be implemented.

In this way by performing path separation in the circuit diagram of RTL, the arrival time of the path which does not satisfy the desired signal arrival time can be decreased, and by this, performance of the circuit can be improved.

Figure 13:
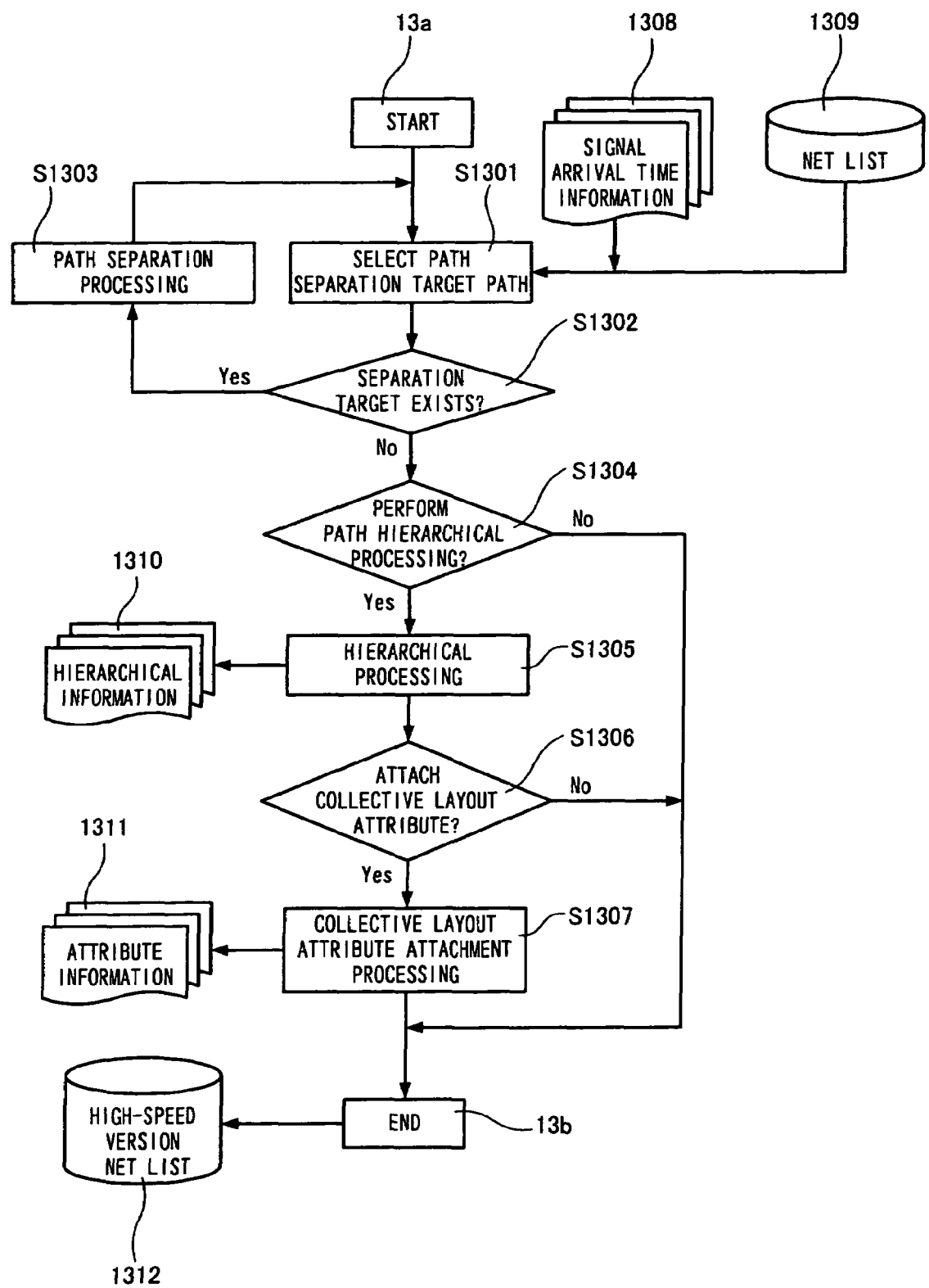
FIG. 13 is a flow chart depicting a procedure when the present invention is applied to a net list.

FIG. 13 shows the details of the path separation processing S106 in FIG. 1, and shows the procedure to change the number of connections for the circuit design diagram of a net list. Here in step S1301, a target path of the path separation processing is selected using the delay time information 1308 of the circuit and the net list 1309. In other words, based on the provided signal arrival time information of the net list, a path to be the target of the path separation is selected from the paths having a signal arrival time exceeding a desired value. For the selection, a path having the longest arrival time may be selected or a path may be selected based on experience. Then in step S1302, it is verified whether the separation target path exists. If there is a separation target path, the processing moves to step S1303 for executing the path separation processing for the target path, and the processing returns to step S1301. If the separation target path does not exist in step S1302, the processing moves to step S1304 for judging whether the path after path separation is set as one functional block in a hierarchical structure. For this judgment method, all the paths may become the targets of hierarchy processing, or only a certain ratio of paths out of the paths with a long arrival time may be the targets of hierarchy processing. To perform hierarchy processing, the processing moves to S1305. If not the processing ends. In step S1305, the hierarchy processing is performed for the separated path. By this processing, the hierarchical path information 1310 is generated. In the next step S1306, it is judged whether the attribute of the collective layout will be attached to the separated path. For the judgment, the attribute may be attached to all the paths for which the path separation was performed, or the attribute is attached only to hierarchical paths, or the attribute is attached only to a certain ratio of paths of the paths having a long arrival time. Processing ends if the attribute will not be attached. If the attribute will be attached, the processing moves to step S1307. In step S1307, the collective layout attribute attachment processing is performed for the paths to which it was decided that the attribute of the collective layout will be attached. In this processing, the attribute information 1311 of the component is generated, and the processing ends. After this series of processings end, the net list 1312 with higher performance is generated.

In this way, by performing the path separation for the net list, in addition to the conventional performance improvement by optimization of the logic synthesis device, the circuit performance can be further improved.

FIG. 14 is a procedure to perform high-speed processing for a hierarchical path set as one functional block using the net list 1312 and the hierarchical information 1310 generated by the processing in FIG. 13. There are two types of high-speed processing to be used here, macro generation processing and component generation processing. Macro generation processing is a method for designing a hierarchical path by full customization as one hard macro. The component generation processing is a method for generating the hierarchical path as one component. Compared with this case of generating one component, higher performance can be implemented in the case of generating a macro, but manual processing is required in the automatic design flow, which makes the development period longer. Therefore macro generation is effective when a major violation is generated against the desired time. Whereas in the case of the component generation processing, that is the case of developing the hierarchical path as a component, this processing can be integrated as a part of the automatic design flow, which makes the development period relatively short. The respective means must be selected considering these characteristics.

Now this procedure will be described. In step S1401 in FIG. 14, where a processing to be performed for the respective hierarchical path is selected from the above mentioned two generation processings using the net list 1312 and the hierarchical information 1310. For this selection method, all the paths may be generated as a macro, or a certain ratio of the paths which generate major violations among the paths which do not satisfy the desired arrival time may be generated as a macro, and the rest of the paths are generated as one component, or this selection may be performed based on experience. After the selection in step S1401, the macro generation processing and the component generation processing are executed in steps S1402 and S1403. In the respective step, the macro information 141 and the component information 142 are generated. Then in step S1404, the portion of the hierarchical paths in the net list 1312 is replaced with the macro or the component generated by the above mentioned generation processing, and the processing ends. By this, the net list 149 with improved circuit performance is created.

Figure 15:
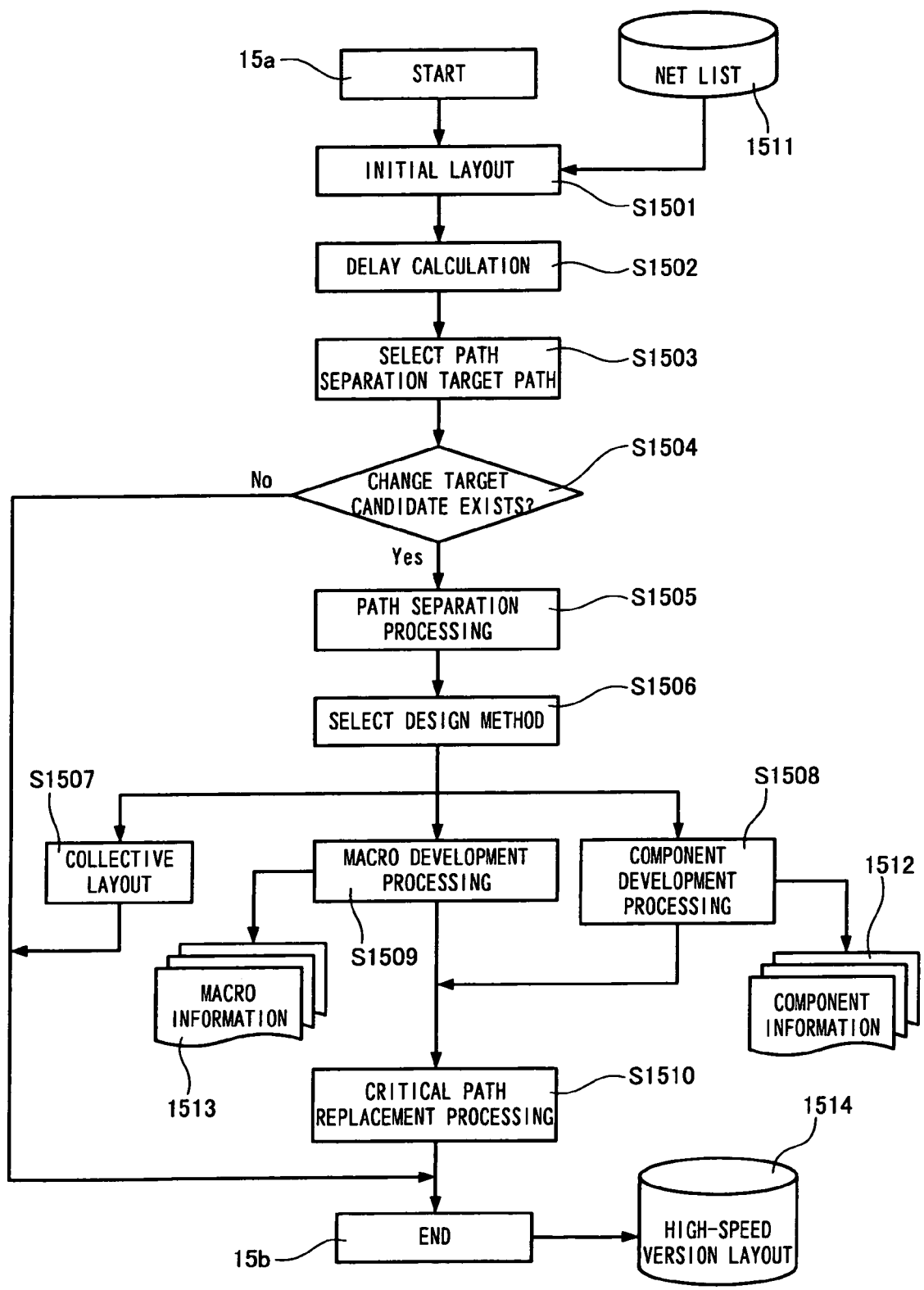
FIG. 15 is a flow chart depicting the procedure when the present invention is applied to a layout.

FIG. 15 shows the details of the path separation processing S107 in FIG. 1, and shows the procedure when the path separation processing is performed for the circuit design diagram of the layout. In step S1501, the initial layout is performed using a net list 1511. Then in step S1502, the delay calculation is performed, and the delay information of the circuit is generated. In step S1503, a target path of the path separation is selected based on the delay information generated in step S1502. For this selection, a path with the longest delay time may be selected, or a path may be selected based on experience. In step S1504, it is verified whether the path separation target path exists. Processing ends if the target path does not exist, and moves to step S1505 if the target path does exist. In step S1505, the path separation processing is performed for the separation target path. In step S1506, a design method for further increasing the speed of the separated path is selected. In other words, one is selected from the three types, that is collective layout (step S1507), macro generation (step S1509) and component generation (step S1508).

In the case of the collective layout in step S1507, the path separation is performed targeting a component belonging to a path having a signal arrival time exceeding a desired value by copying the component and connecting the output thereof to another component, and the components of this separated path are positioned within a certain area.

In the case of the macro generation in step S1509, a hierarchical path is designed by full customization as one hard macro. In other words, targeting a component belonging to a path having a signal arrival time exceeding a desired value, the path separation is performed by copying the component and connecting the output thereof to another component, and this separated path is generated as one macro and is replaced with this separated path.

In the component generation in step S1508, the path separation is performed for a path having a signal arrival time exceeding a desired value in the design circuit diagram including the physical information generated by the layout optimization device and the layout device, based on the signal arrival time information of the circuit, the layout and wiring information and the capacity and resistance values to be connected to the output of the components, and this separated path is generated as one component of the structure where the components belonging to the path are adjacent to each other, and is replaced with this separated path.

After selecting the above mentioned design method in step S1506, the processing according to the selected design method is performed for each path respectively in step S1507, S1508 and S1509. In the component generation processing in step S1508, the component information 1512 is generated, and in the macro generation processing in step S1509, the macro information 1513 is generated. After performing the collective layout processing in step S1507, the processing ends. After the processings in steps S1508 and S1509, the path replacement processing is performed in step S1510, and the processing ends. By this, a layout 1514 with improved circuit performance is generated.

Figure 16:
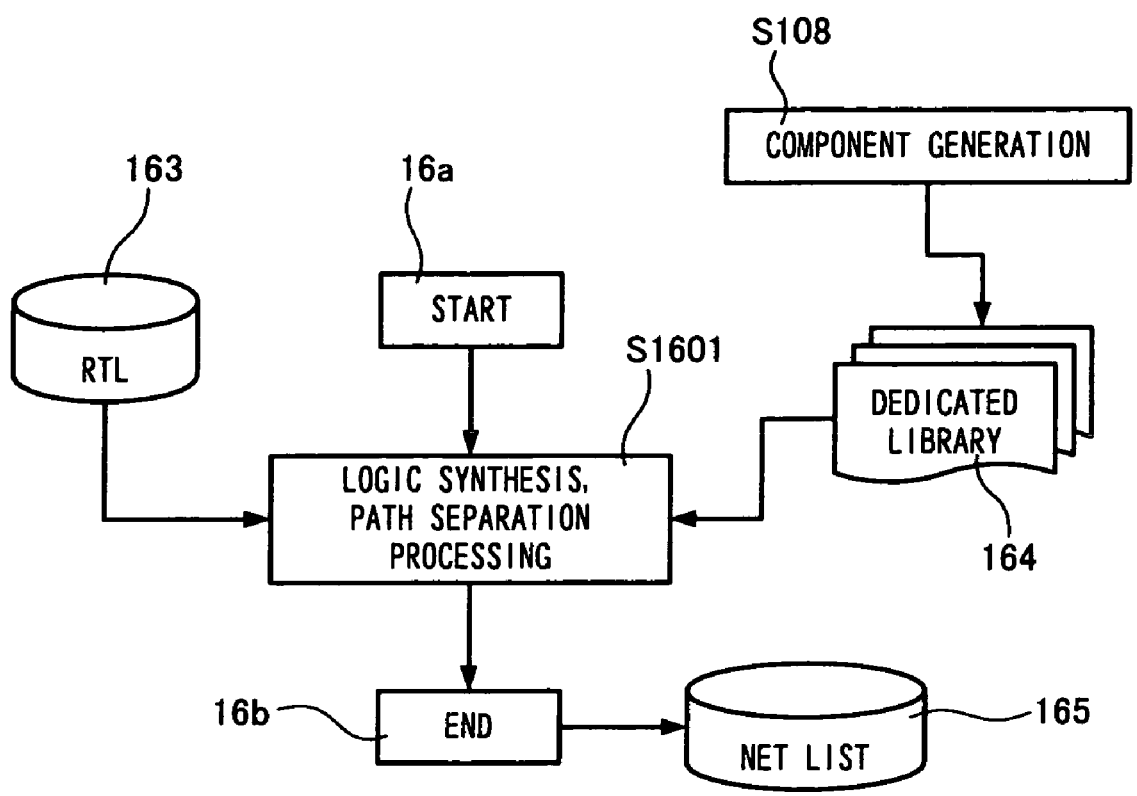
FIG. 16 is a flow chart depicting an example when the path separation processing according to the present invention is used with a logic synthesis processing.

FIG. 16 shows a procedure to perform the path separation at logic synthesis using the component generation processing S108 and the logic synthesis processing S101 in FIG. 1. In the component generation processing S108 in FIG. 1, the dedicated components having the two output terminals shown in FIG. 3 are generated in advance, so that the library 164 of the dedicated components shown in FIG. 16 is generated. In the library 164, in addition to the components having a plurality of output terminals, components with a single terminal, which is prior art, are included. In the case of the component generation processing S108 in FIG. 1, when a component having a plurality of output ends is generated, an attribute to connect only one component, so as to be recognized by the logic synthesis device, is added to one output end of the two output ends. Then in step S1601 in FIG. 16, the logic synthesis is performed using RTL 163 and the dedicated component library 164. At this time, the logic synthesis device calculates the delay time of the path, and performs path separation for a path having a signal arrival time which does not reach a desired value by using the components having a plurality of output ends included in the library 164, so as to decrease the delay time. When the component is replaced, only the component belonging to the path having a signal arrival time exceeding a desired value is connected to one output end, based on the attribute attached in the component generation processing S108 in FIG. 1, and the other components are connected to output ends which are different from the above mentioned output end, so that the delay time is decreased, and circuit performance is improved. After executing the processing in step S1601, the processing ends.

In this way, the path separation processing can be performed using a conventional logic synthesis device, and the net list 165, of which the circuit performance is improved compared with the conventionally generated net list, can be generated.

As described above, in the design method for a semiconductor integrated circuit device according to the present invention, a method for improving performance of the semiconductor integrated circuit device is used by being integrated into a convention semiconductor device design flow, so it is useful as a design method for a semiconductor integrated circuit device for developing a device having higher performance, than the case of the conventional semiconductor integrated circuit device. The present invention can also be applied to such applications as for decreasing area and decreasing power consumption.

What is claimed is:

1. A design method for a semiconductor integrated circuit device, using path isolation, the method comprising:
generating a dedicated cell comprising a plurality of output ends;

isolating a specific path having a signal arrival time longer than a desired signal arrival time from a plurality of other paths in the device;
replacing a component belonging to the specific path with the dedicated cell;
connecting one of the output ends of the dedicated cell to the specific path; and
connecting a remainder of the output ends to the plurality of other paths and decreasing a number of other components connected to the specific path,
wherein the dedicated cell has an identical logic as the component.

2. The design method according to claim 1, wherein the path isolation is performed for a part or all components belonging to the specific path having a signal arrival time longer than a desired signal arrival time.

3. The design method according to claim 1, wherein the separating the specific path comprises:
selecting a target component at a start point side of the specific path to be replaced with the dedicated cell;
separating the specific path by replacing the target component with the dedicated cell and connecting the output of the dedicated cell to subsequent components on the specific path; and
separating the specific path sequentially up to an end point side of the specific path until the signal arrival time no longer exceeds the desired value.

4. The design method according to claim 3, wherein the isolating the specific path further comprises:
replacing components in the plurality of other paths that have a signal arrival time longer than a desired signal arrival time with another dedicated cell when the isolating the specific path causes the plurality of other paths to not satisfy a desired signal arrival time.

5. The design method according to claim 1, wherein the separating the specific path comprises:
tabulating the signal arrival time of the circuit device and a number of subsequent components connected to each of the components on the specific path,
selecting a target component which has a highest number of the subsequent components among the components on the specific path; and
performing path isolation with the target component as the component to be replaced with the dedicated cell.

6. The design method according to claim 1, wherein the isolating the specific path comprises:
performing the path isolation on a circuit written in RTL based on information on the signal arrival time of the semiconductor integrated circuit device; and
generating a new circuit written in RTL.

7. The design method according to claim 1, wherein the isolating the specific path comprises:
performing the path isolation in a net list generated by a logic synthesis device, based on information on the signal arrival time of the circuit device; and
generating a new net list.

8. The design method according to claim 7, wherein performing the path isolation comprises generating the isolated path as one functional block hierarchy.

9. The design method according to claim 7, wherein performing the path isolation comprises:
laying out the components of the isolated path by layout optimization processing; and
attaching a specific attribute for the laying out the components in close proximity.

10. The design method according to claim 7, wherein the performing the path isolation comprises
generating the isolated path as one macro; and
replacing the macro with the isolated path.

11. The design method according to claim 7, wherein the performing the path isolation comprises:
generating a compound component based on one or all of the components belonging to the isolated path; and
replacing the one or all of the components belonging to the isolated path with the compound component.

12. The design method according to claim 7, wherein the performing the path isolation comprises:
implementing a part of the isolated path as a macro based on a predetermined standard; and
implementing another part thereof as components.

13. The design according to claim 1, wherein the isolating the specific path comprises:
performing the path isolation in a design circuit diagram including physical information generated by a layout optimization device and a layout device, the path isolation based on signal arrival time information of the circuit, layout and wiring information of the circuit, and capacitance and resistance values to be connected to the output of the components; and
generating a net list, and a new layout and wiring information.

14. The design method according to claim 13, wherein the path isolation comprises:
replacing multiple components with the dedicated cell and connecting the output of the dedicated cell to the other components; and
laying out the multiple components of the isolated path within a certain area.

15. The design method according to claim 13, wherein the path isolation comprises:
generating the isolated path as one macro; and
replacing the macro with the isolated path.

16. The design method according to claim 13, wherein the path isolation comprises:
generating a compound component generated from one or all of the components belonging to the isolated path; and
replacing the one or all of the components with the generated compound component.

17. A design method for a semiconductor integrated circuit device using path isolation, the method comprising
preparing a dedicated cell comprising a plurality of output ends;
applying the dedicated cell to a component belonging to a specific path having a signal arrival time longer than a desired signal arrival time at logic synthesis by a logic synthesis device and/or at optimization after the logic synthesis based on information on the signal arrival time of the circuit, and
replacing the component belonging to the specific path with the dedicated cell;
connecting one output end of the dedicated cell to the specific path; and
connecting other output ends of the dedicated cell to other paths and decreasing a number of other components connected to the specific path,
wherein the dedicated cell has an identical logic as the component.

18. The design method according to claim 17, wherein the applying the dedicated cell to the component comprises adding an attribute to connect only one logic element to at least one of the output ends of the component.

* * * * *